(12) United States Patent
Budianu et al.

(10) Patent No.: US 8,315,660 B2
(45) Date of Patent: Nov. 20, 2012

(54) USER POWER OFFSET ESTIMATION USING DEDICATED PILOT TONES FOR OFDMA

(75) Inventors: Petru Cristian Budianu, San Diego, CA (US); Dhananjay A. Gore, San Diego, CA (US); Alexei Y. Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1415 days.

(21) Appl. No.: 11/675,055

(22) Filed: Feb. 14, 2007

(65) Prior Publication Data

US 2008/0192868 A1 Aug. 14, 2008

(51) Int. Cl.
*H04B 7/00* (2006.01)
(52) U.S. Cl. ............. 455/522; 445/67.11; 445/67.13; 445/226.1; 445/226.2; 445/226.3; 370/311
(58) Field of Classification Search .......... 370/311; 455/522, 67.11, 67.13, 226.1–226.3
See application file for complete search history.

(56) References Cited

U.S. PATENT DOCUMENTS

| | | | | |
|---|---|---|---|---|
| 6,173,162 B1 * | 1/2001 | Dahlman et al. | ........... | 455/69 |
| 7,085,239 B2 * | 8/2006 | Ling et al. | ........... | 370/252 |
| 7,200,190 B2 * | 4/2007 | Malette et al. | ........... | 375/340 |
| 7,299,402 B2 * | 11/2007 | Soong et al. | ........... | 714/807 |
| 7,428,262 B2 * | 9/2008 | Zancho et al. | ........... | 375/148 |
| 7,657,277 B2 * | 2/2010 | Montojo et al. | ........... | 455/522 |
| 7,702,355 B2 * | 4/2010 | Jonsson et al. | ........... | 455/525 |
| 2004/0176038 A1 * | 9/2004 | Luo et al. | ........... | 455/67.11 |
| 2005/0239467 A1 | 10/2005 | Nishio | | |
| 2007/0026803 A1 * | 2/2007 | Malm | ........... | 455/63.1 |
| 2007/0036066 A1 * | 2/2007 | Thomas et al. | ........... | 370/208 |
| 2007/0082692 A1 * | 4/2007 | Tirkkonen et al. | ........... | 455/522 |
| 2010/0004015 A1 * | 1/2010 | Nilsson et al. | ........... | 455/522 |

FOREIGN PATENT DOCUMENTS

| | | |
|---|---|---|
| JP | 2004080530 A | 3/2004 |
| JP | 2004514320 A | 5/2004 |
| JP | 2008048319 A | 2/2008 |
| JP | 2008177965 A | 7/2008 |
| KR | 20070007354 A | 1/2007 |
| WO | WO0239623 A1 | 5/2002 |
| WO | WO2005109672 A1 | 11/2005 |
| WO | 2006031187 | 3/2006 |
| WO | 2007014345 | 2/2007 |
| WO | WO2007052753 A1 | 5/2007 |
| WO | 2008042946 | 4/2008 |
| WO | WO2008056774 A1 | 5/2008 |

OTHER PUBLICATIONS

International Search Report—PCT/US2008/053758 International Search Authority—European Patent Office—Jul. 5, 2008—Patent.
Written Opinion—PCT/US2008/053758, International Search Authority—European Patent Office—Jul. 26, 2008.
Taiwan Search Report—TW097105207—TIPO—Oct. 15, 2011.

* cited by examiner

*Primary Examiner* — Temica M Beamer
(74) *Attorney, Agent, or Firm* — Donald C. Kordich

(57) ABSTRACT

A method of user power offset estimation for a wireless communication system is disclosed. Dedicated pilot symbols transmitted over at least one time-frequency region for a user are received. Power offset of the user is estimated based on the received dedicated pilot symbols.

48 Claims, 8 Drawing Sheets

USER POWER OFFSET ESTIMATION USING DEDICATED PILOT TONES FOR OFDMA

BACKGROUND

1. Field

The present disclosure relates to wireless communication systems, and more particularly to estimation of user power offset in such systems.

2. Background

An orthogonal frequency division multiple access (OFDMA) system utilizes orthogonal frequency division multiplexing (OFDM), which effectively partitions the overall system bandwidth into a number of (N) orthogonal frequency subbands. These subbands are also referred to as tones, sub-carriers, bins, frequency channels, and so on. Each subband is associated with a respective sub-carrier that may be modulated with data. An OFDMA system may use any combination of time, frequency, and/or code division multiplexing.

For an OFDMA system, multiple "traffic" channels may be defined whereby (1) each subband is used for only one traffic channel in any given time interval and (2) each traffic channel may be assigned zero, one, or multiple subbands in each time interval. The traffic channels may include "data" channels used to send traffic/packet data and "control" channels used to send overhead/control data. The traffic channels may also be referred to as physical channels, transport channels, or some other terminology.

The traffic channels for each sector may be defined to be orthogonal to one another in time and frequency so that no two traffic channels use the same subband in any given time interval. This orthogonality avoids intra-sector interference among multiple transmissions sent simultaneously on multiple traffic channels in the same sector. Some loss of orthogonality may result from various effects such as, for example, inter-carrier interference (ICI) and inter-symbol interference (ISI).

In a wireless communication system such as the OFDMA system, it is often necessary to estimate the response of a wireless channel from a transmitter to a receiver. The channel estimate may be used for various purposes such as data detection, time synchronization, frequency correction, spatial processing, rate selection, and so on. Channel estimation is typically performed by transmitting a pilot signal containing pilot symbols that are known a priori by both the transmitter and receiver. The receiver can then estimate the channel gains as a ratio of the received pilot symbols over the known pilot symbols.

The pilot signal is typically impaired by both noise and interference. These impairments degrade the quality of the channel estimate obtained by the receiver based on the received pilot signal. The noise can come from various sources such as the wireless channel, receiver properties, and so on. Noise impairment can normally be addressed by transmitting the pilot signal in a proper manner and/or for a sufficient period of time such that the receiver can obtain the desired quality for the channel estimate. The interference can result from multiple transmitters transmitting their pilot signals simultaneously. These transmitters may be for different base stations in the system, different antennas of the same base station, and so on. The pilot signal from each transmitter may act as interference to the pilot signals from other transmitters. This pilot interference degrades the quality of the channel estimate.

It is often desired to estimate the channel and the level of interference. On the forward link (FL), common pilot symbols are known to have been used. In the OFDMA system, such common pilot symbols are typically scattered over the entire bandwidth shared by all the users. In a traditional single-antenna transmission, such common pilot symbols may be exploited by all the users for the purpose of FL channel estimation. The bandwidth and channel coherence time values that are typical in cellular applications render common pilot tones particularly useful.

The relative bandwidth efficiency of the common pilot versus dedicated pilot may be made by a comparison between the total number of degrees of freedom in a broadband channel corresponding to the total shared bandwidth, estimated with the common pilot, and the number of degrees of freedom in a narrow-band sub-channel allocated per user times the number of such narrow-band sub-channels. For bandwidth and channel coherence time values that are typical in cellular applications, this balances in favor of the common pilot. Nevertheless, the dedicated pilot approach has a number of attractive features.

User power offset provides the average received power of the signal when the transmitted signal has unit power. Conventionally it is assumed that the user power offset is known and is received as an input to a channel estimation block. However, it has not been shown how the user power offset is estimated.

Thus, there exists a need to provide a method and apparatus of estimating user power offset with dedicated pilot tones for OFDMA.

SUMMARY

In one aspect, the present disclosure provides a method of user power offset estimation for a wireless communication system. Dedicated pilot symbols transmitted over at least one time-frequency region for a user are received. Power offset of the user is estimated based on the received dedicated pilot symbols.

In an additional aspect, the present disclosure provides an apparatus operable in a wireless communication system. The apparatus includes a processor, which is configured to receive dedicated pilot symbols transmitted over at least one time-frequency region for a user and estimate power offset of the user based on the received dedicated pilot symbols. The apparatus further includes a memory coupled to the processor.

In another aspect, the present disclosure provides an apparatus operable in a wireless communication system. The apparatus includes means for receiving dedicated pilot symbols transmitted over at least one time-frequency region for a user, and means for estimating power offset of the user based on the received dedicated pilot symbols.

In a further aspect, the present disclosure provides a computer program product, which includes a computer-readable medium. The computer-readable medium includes code for causing a computer to receive dedicated pilot symbols transmitted over at least one time-frequency region for a user, and code for causing the computer to estimate power offset of the user based on the received dedicated pilot symbols.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

In certain aspects, the present disclosure provides a user power offset estimation method and apparatus. The user power offset is needed by the channel and interference estimation block for the computation of MMSE (Minimum Mean Square Error) ratios. The present method uses some intermediate outputs of the channel and interference estimation block. Thus, a user power offset estimation block may be embedded in the channel and interference estimation block. This approach is advantageous because the power offset of each user may be computed separately for each tile, using the pilots of the specific tile. Thus, the present method allows the channel estimation to operate properly regardless of the distribution of the received power across the whole bandwidth.

Since the user power offset estimation block may be embedded in the channel estimation block, it can be regarded as an improvement to the channel estimation block. However, the power offsets may also be used for other purposes, such as Channel Quality Indicator (CQI) computation.

Figure 1:
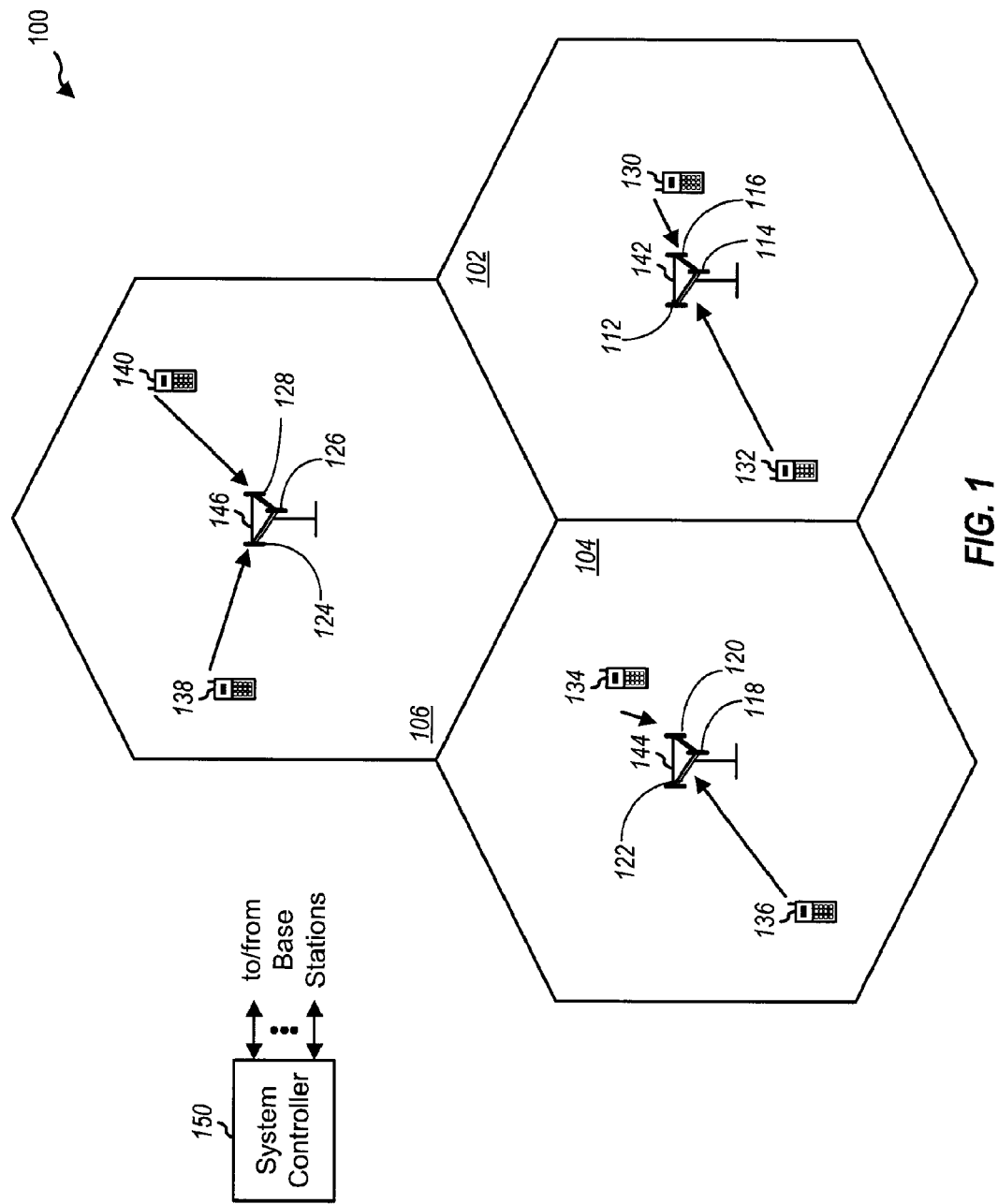
FIG. 1 illustrates an exemplary multiple access wireless communication system.

Referring to FIG. 1, a multiple access wireless communication system 100 according to one aspect of the present disclosure is illustrated. The present user power offset estimation method may be implemented in the system 100. The multiple access wireless communication system 100 includes multiple access points 142, 144 and 146. An access point provides communication coverage for a respective geographic area. An access point and/or its coverage area may be referred to as a "cell", depending on the context in which the term is used. For example, the multiple access wireless communication system 100 includes multiple cells 102, 104, and 106. To increase capacity, the coverage area of each access point may be partitioned into multiple (e.g., three) sectors. The multiple sectors may be formed by groups of antennas, each responsible for communication with access terminals in a portion of the cell. For example, in the cell 102, antenna groups 112, 114, and 116 each correspond to a different sector, in the cell 104, antenna groups 118, 120, and 122 each correspond to a different sector, and in the cell 106, antenna groups 124, 126, and 128 each correspond to a different sector.

In each cell one or more access terminals may be in communication with one or more sectors of each access point. For example, access terminals 130 and 132 are in communication with the access point 142, access terminals 134 and 136 are in communication with the access point 144, and access terminals 138 and 140 are in communication with the access point 146.

For a centralized architecture, a system controller 150 couples to the access points 142, 144 and 146, provides coordination and control for these access points, and further controls the routing of data for the terminals served by these access points. For a distributed architecture, the access points may communicate with one another as needed, e.g., to serve a terminal in communication with an access points, to coordinate the usage of subbands, and so on.

As shown in FIG. 1, the access terminals 130, 132, 134, 136, 138, and 140 are each located in a different portion of its respective cell, relative to each other access terminal in the same cell. Further, each access terminal may be at a different distance from the corresponding antenna groups with which it is communicating. Both of these factors provide situations, due to environmental and other conditions in the cell, which may cause different channel conditions to be present between each access terminal and the corresponding antenna group with which it is communicating.

As used herein, an access point (AP) may be a fixed station used for communicating with the terminals and may also be referred to as, and include some or all the functionality of, a base station, a Node B, or some other terminology. An access terminal (AT) may also be referred to as, and include some or all the functionality of, a user equipment (UE), a wireless communication device, a terminal, a mobile station or some other terminology.

Figure 2:
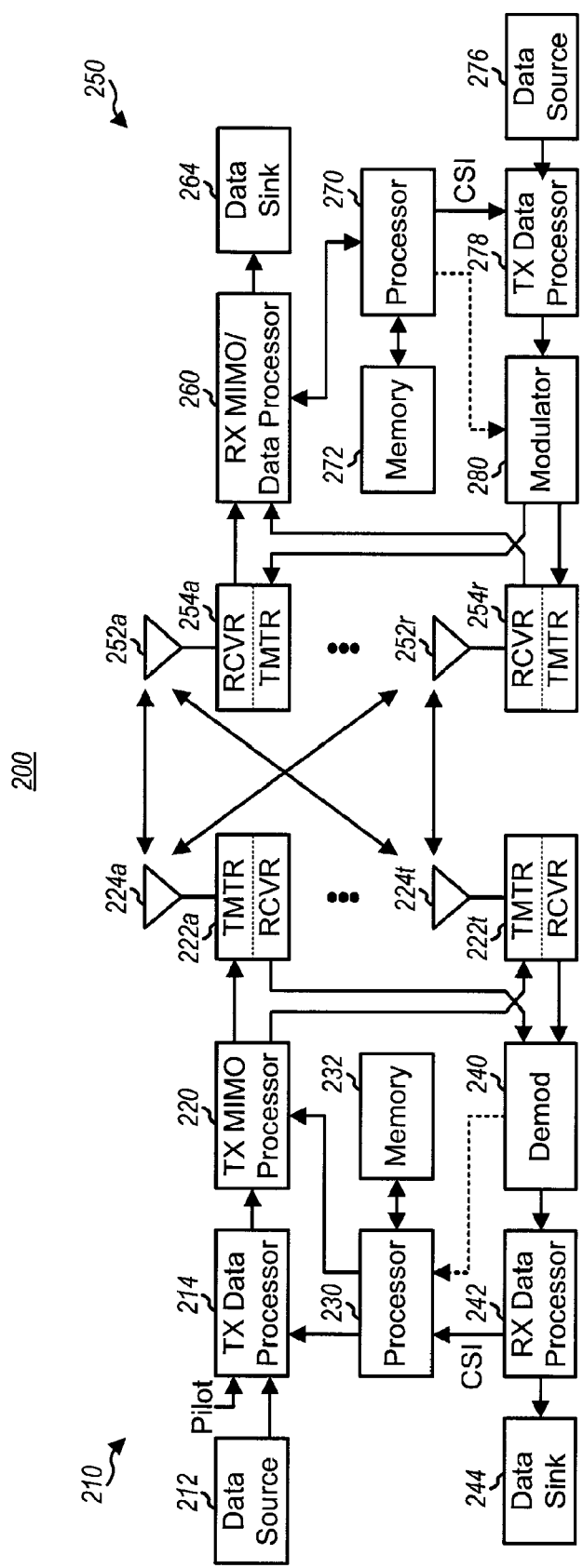
FIG. 2 illustrates an exemplary transmitter and an exemplary receiver in a multiple access wireless communication system.

Referring to FIG. 2, a transmitter system 210 and a receiver system 250 in a multiple access wireless communication system 200 in accordance with an aspect of the present disclosure are illustrated. The present user power offset estimation method may be implemented in the system 200. At the transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. In some embodiments, TX data processor 214 applies precoding weights to the symbols of the data streams based upon the user and the antenna from which the symbols are being transmitted. In some embodiments, the precoding weights may be generated based upon an index to a codebook generated at a transceiver 254 and provided as feedback to a transceiver 222 which has knowledge of the codebook and its indices. Further, in those cases of scheduled transmissions, the TX data processor 214 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by the processor 230. As discussed above, in some embodiments, the packet format for one or more streams may be varied according to the rank information that is transmitted from the user.

The modulation symbols for all data streams are then provided to a TX MIMO processor 220, which may further process the modulation symbols (e.g., for OFDM). TX MIMO processor 220 then provides $N_T$ modulation symbol streams to NT transceivers (TMTR) 222a through 222t. In certain embodiments, TX MIMO processor 220 applies precoding weights to the symbols of the data streams based upon the user to which the symbols are being transmitted to and the antenna from which the symbol is being transmitted from that user channel response information.

Each transceiver 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 222a through 222t are then transmitted from $N_T$ antennas 224a through 224t, respectively. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

At the receiver system 250, the transmitted modulated signals are received by $N_R$ antennas 252a through 252r and the received signal from each antenna 252 is provided to a respective transceiver (RCVR) 254. Each transceiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ transceivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 260 is complementary to that performed by TX MIMO processor 220 and TX data processor 214 at the transmitter system 210.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides estimated channel state information (CSI), which may comprise various types of information regarding the communication link and/or the received data stream. For example, the CSI may comprise only the operating SNR. The CSI is then processed by a TX data processor 278, which also receives traffic data for a number of data streams from a data source 276, modulated by a modulator 280, conditioned by transceivers 254a through 254r, and transmitted back to the transmitter system 210.

At the transmitter system 210, the modulated signals from the receiver system 250 are received by antennas 224, conditioned by receivers 222, demodulated by a demodulator 240, and processed by a RX data processor 242 to recover the CSI reported by the receiver system. The reported quantized information, e.g. CQI, is then provided to processor 230 and used to (1) determine the data rates and coding and modulation schemes to be used for the data streams, and (2) to generate various controls for TX data processor 214 and TX MIMO processor 220.

1. System Model

Generally, the transmission bandwidth may be divided into hop regions. The symbols of one hop region are assigned to multiple users and are processed together by the AT or AP for the multiple users assigned to the hop region. One hop region includes the symbols transmitted in $N_S$ successive OFDM symbols over the same contiguous set of $N_T$ tones. Thus, there are $N_S \times N_T$ symbols in one hop region. The hop region is also referred to as a time-frequency region. Depending on the context, a time-frequency region may be a tile or a subtile.

In certain aspects, there may be Q users that share one hop region. The term "user" is transposable with the term "layer" as used herein in the forward link. In this aspect, a single terminal may correspond to multiple users, as it may transmit multiple streams if it has multiple transmit antennas. However, in some cases, each terminal may only transmit a single layer and thus be one user.

Figure 3:
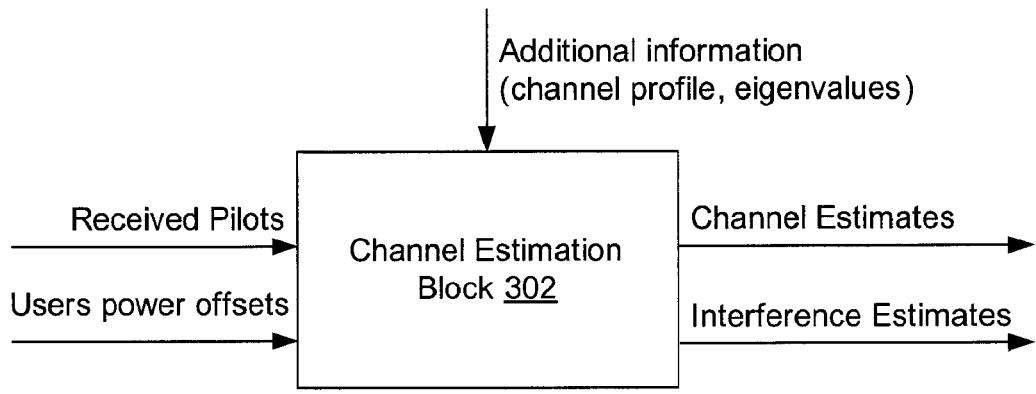
FIG. 3 shows an prior art channel estimation block.
Figure 4:
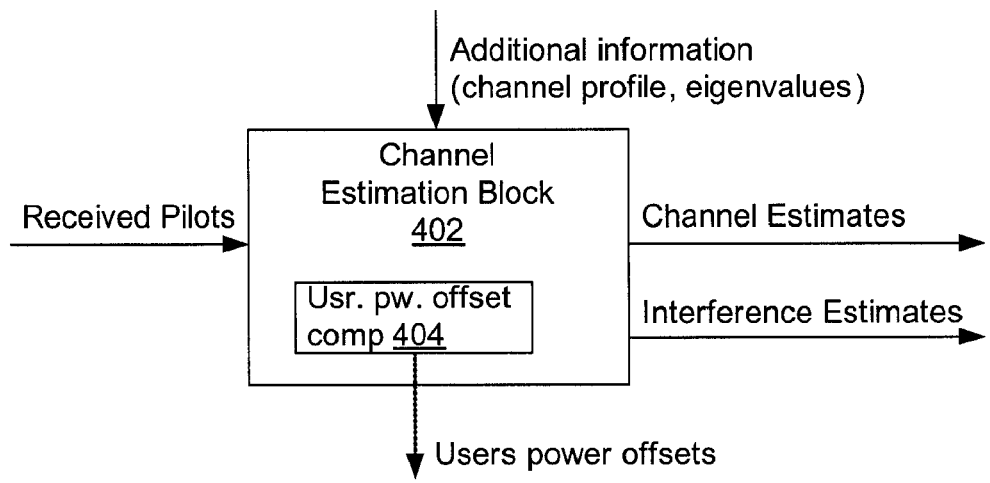
FIG. 4 shows an exemplary channel estimation block with embedded user power offset estimation according to one aspect of the present disclosure.

The vector of received symbols in one hop region, denoted by y, is an $N_S N_T \times 1$ vector of complex numbers, given by $$y = \sum_{q=1}^{Q} \Delta_q h^{(q)} \cdot S^{(q)} + n_0 \qquad (1)$$

where the first $N_T$ elements of y (and all the other vectors in the equation (1)) correspond to the channel for the tones of the first OFDM symbol, and so on. $\Delta_q^2$, where q=1, ..., Q, is the power offset of user q, which is needed for the second stage of channel estimation algorithm and may be estimated based on the received pilots. User power offset gives the average received power of the signal when the transmitted signal has unit power. As shown in FIG. 3, conventionally it is assumed that the user power offset $\Delta_q^2$ is known and is received as an input to a channel estimation block 302. However, it has not been shown how the user power offset $\Delta_q^2$ is obtained. The present method may uses some intermediate outputs of a channel and interference estimation block to estimate the user power offset $\Delta_q^2$ based on the received pilots. Thus, as shown in FIG. 4, a user power offset estimation block 404 may be embedded in a channel and interference estimation block 402. In addition, the power offsets may be used for other purposes, such as Channel Quality Indicator (CQI) computation.

In Equation (1), $S^{(q)}$, where q=1, ..., Q, $N_S N_T \times 1$ vector of complex numbers, is the vector of modulation symbols transmitted by user q within one hop region. $h^{(q)}$, q=1, ..., Q. $N_S N_T \times 1$ vector of complex numbers, is the frequency domain channel of user q. The channel coefficients $h^{(q)}$ may be assumed independent among users. For each user, $h^{(q)}$ is generally considered a complex Gaussian function, with a zero mean and a known covariance matrix. $n_0$, $N_S N_T \times 1$ vector of complex numbers, is the CAWGN (which includes the interference), and is assumed to have a zero mean and a covariance matrix $\sigma^2 I$. The noise variance $\sigma^2$ is unknown.

In some aspects, the present system model may be used to estimate the channel coefficients of all users and the interference. For this, dedicated pilot symbols are inserted among the data symbols in a give hop region. The estimation may be based on the received pilot symbols and on the knowledge of the statistical properties of the channel.

1.1 Channel Model

The statistical properties of the channel are assumed known. For each user, the channel coefficients over one hop region may be assumed to be correlated. If this is the case, the following approximations may be accurate enough to be utilized for channel estimation.

1.1.1 Structure of Channel Covariance Matrix

Practically, the structure of the channel covariance matrix of one user has at most three significant eigenvalues, and the corresponding eigenvectors can be approximated by analytical expressions:

$$E\{h^{(q)} h^{(q)H}\} \approx \sum_{i=1}^{3} \Lambda_i^{(q)} U_i U_i^H \qquad (2)$$

where $U_1$, $U_2$, $U_3$ are explained below.

The following definition of the Kronecker product may be utilized in approximating the covariance matrix. Given the vectors $a_{n\times 1}$ and $b_{m\times 1}$, their Kronecker product $c_{mn\times 1} := a_{n\times 1} \otimes b_{m\times 1}$ is defined as $$c := \begin{bmatrix} a_1 b \\ a_2 b \\ \vdots \\ a_n b \end{bmatrix} = \begin{bmatrix} a_1 b_1, a_1 b_2, \ldots, a_1 b_m, a_2 b_1, a_2 b_2, \ldots, \\ a_2 b_m, \ldots, a_n b_1, a_n b_2, \ldots, a_n b_m \end{bmatrix}^T \quad (3)$$

Further the following vectors may be defined:

$$U_{N_s,0} := \frac{1}{\sqrt{N_s}} [1, \ldots 1]^T \quad (4)$$

$N_s \times 1$ Vector $$U_{N_s,1} := \sqrt{\frac{3}{N_s(N_s^2 - 1)}} [-(N_s - 1) : 2 : (N_s - 1)]^T \quad (5)$$

$N_s \times 1$ vector $$U_{N_t,0} := \frac{1}{\sqrt{N_t}} [1, \ldots 1]^T \quad (6)$$

$N_t \times 1$ vector $$U_{N_t,1} := \sqrt{\frac{3}{N_t(N_t^2 - 1)}} [-(N_t - 1) : 2 : (N_t - 1)]^T \quad (7)$$

$N_t \times 1$ vector

The following 3 vectors of size $N_s N_t \times 1$ are called approximative eigenvectors and they are used instead of the real eigenvectors for the estimation of the channel corresponding to the data symbols:

$$U_1 := U_{N_s,0} \otimes U_{N_t,0}; \quad U_2 := U_{N_s,0} \otimes U_{N_t,1};$$
$$U_3 := U_{N_s,1} \otimes U_{N_t,0};$$

In some aspects, it may be that the first eigenvalue is at least one order of magnitude larger than the other two. The structure of the covariance matrix described previously may be utilized to provide the following approximate representation of the channel.

1.1.2 Taylor Approximation of Channel Function

The channel of each user over the hop region may be written as a random function of time and frequency $\xi^{(q)}(t, f)$. Then, $\xi^{(q)}(t, f)$ can be approximated accurately by the first three terms of the Taylor series expansion:

$$\xi^{(q)}(t, f) \approx \quad (8)$$

$$\xi^{(q)}(t_0, f_0) + \frac{\partial \xi^{(q)}(t, f)}{\partial f}\bigg|_{(t_0,f_0)} (f - f_0) + \frac{\partial \xi^{(q)}(t, f)}{\partial t}\bigg|_{(t_0,f_0)} (t - t_0)$$

Thus, in this approximation, the channel over one hop region may be characterized by three complex parameters.

If $(t_0, f_0)$ is defined to be the center of symmetry of the hop region, the channel of one user corresponding to a symbol of coordinates $(n_S, n_T)$ may be written as follows:

$$h^{(q)}(n_S, n_T) \approx \alpha^{(q)} + \beta_F^{(q)}(n_T - n_{T0}) + \beta_T^{(q)}(n_S - n_{S0}) \quad (9)$$

where $n_{T0} := (N_T + 1)/2$ and $n_{S0} := (N_S + 1)/2$ are the coordinates of the center of the hop region, $a^{(q)}$ is the DC component, and $\beta_F^{(q)}$, $\beta_T^{(q)}$ are the slopes in frequency and time, respectively.

1.2 Pilot Insertion Scheme

Figure 5A:
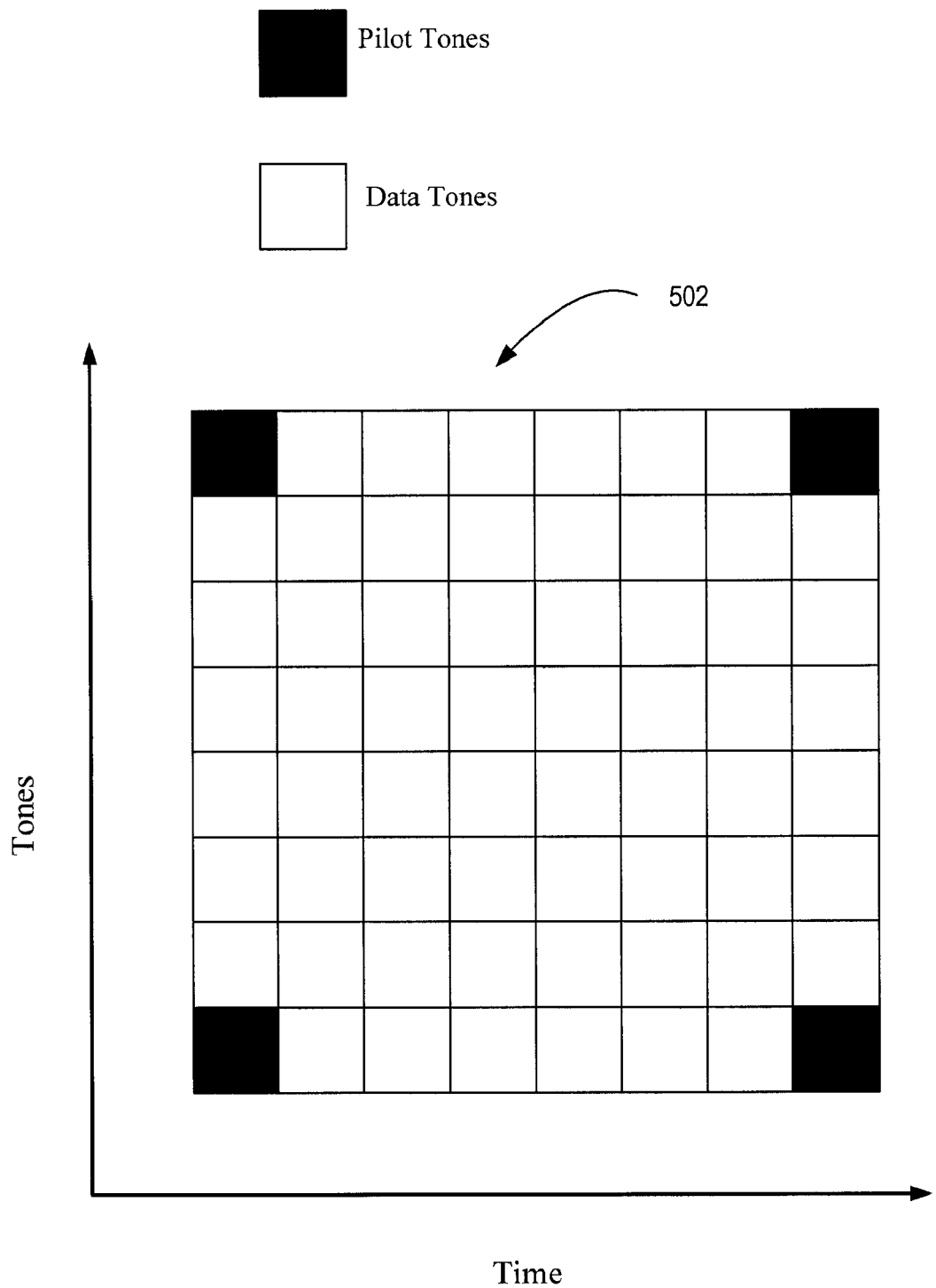
FIGS. 5A, 5B and 5C show dedicated pilot symbols disposed among data symbols in a time-frequency region in accordance with exemplary aspects of the present disclosure.
Figure 5B:
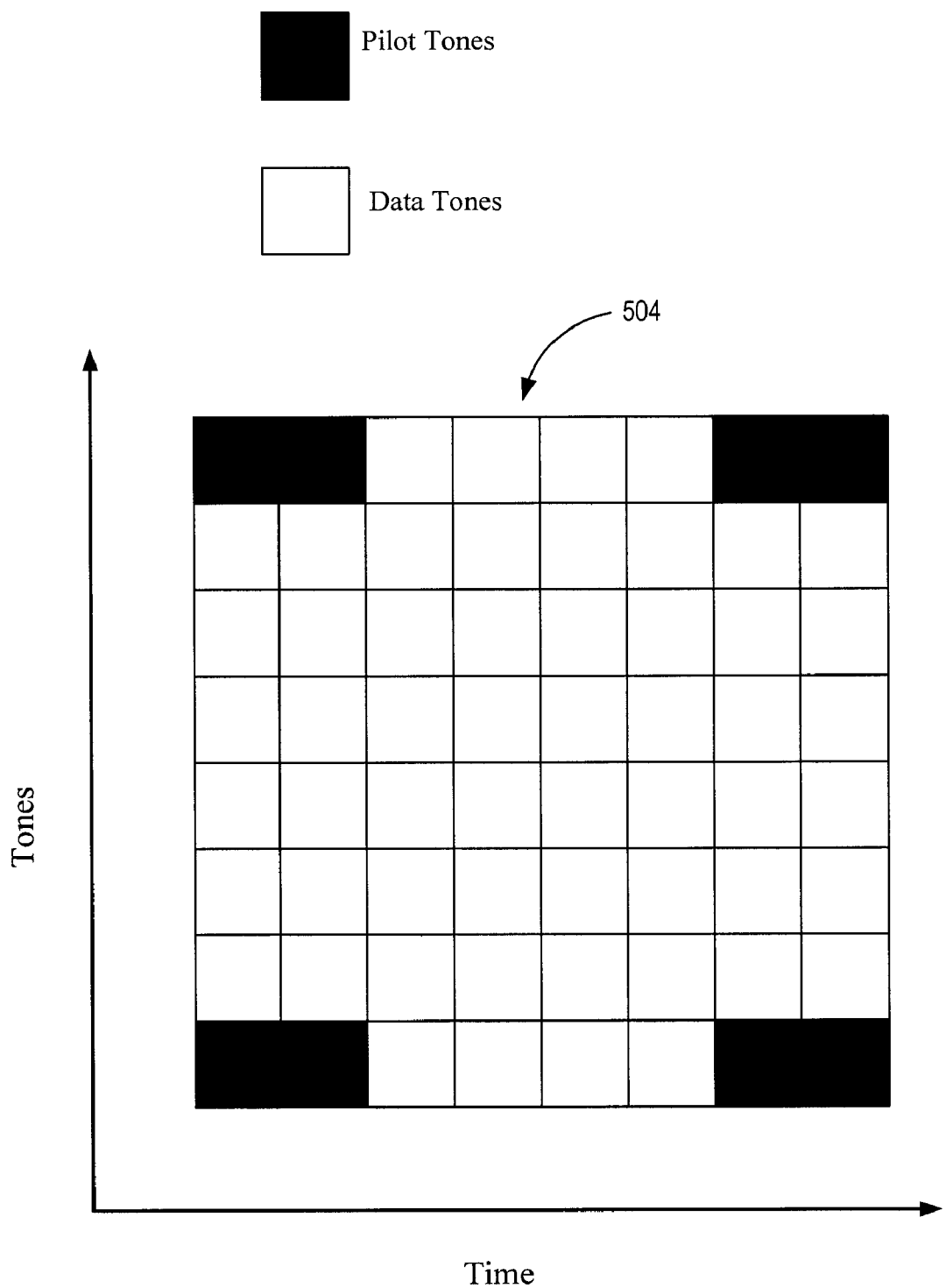
Figure 5C:
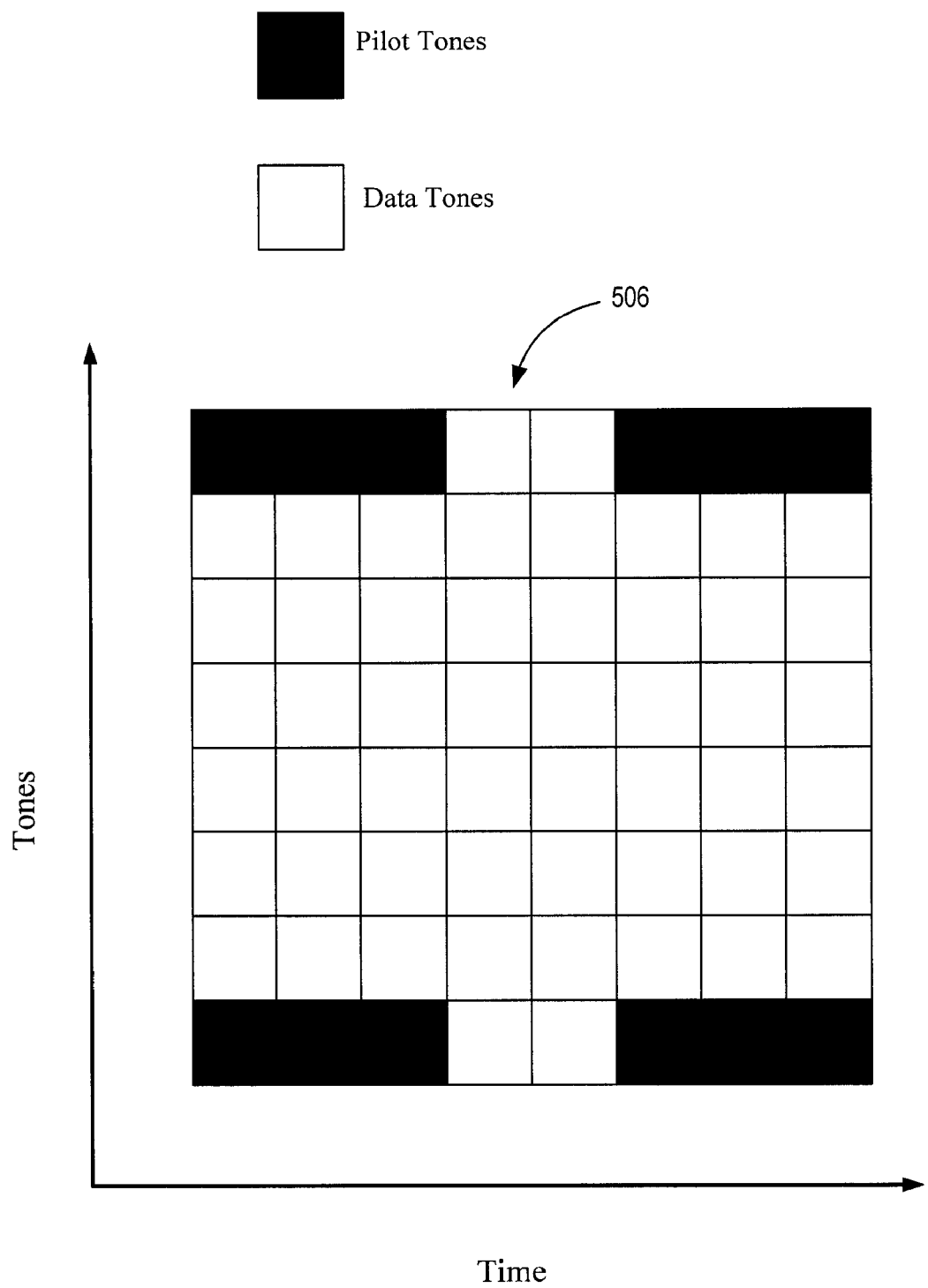

In one aspect, pilot symbols within a hop region are placed in a pattern that satisfies the following conditions: (1) there are a total of $N_P$ pilot symbols in one hop region; (2) the pilot symbols are grouped in 4 clusters, each cluster having $M_Q$ symbols; thus $N_P = 4M_Q$; (3) the pilot symbols of one cluster occupy a contiguous region in the time-frequency domain, such that, for each user, the variations of the channel within the symbols of one cluster are as small as possible; and (4) the pilot placement scheme is symmetric with respect to the center of symmetry of the hop region. In certain aspects, the number of users that share one hop region does not exceed the cluster size: $Q \leq M_Q$. FIGS. 5A, 5B, and 5C show dedicated pilot symbols disposed among data symbols in a time-frequency region in accordance with exemplary aspects of the present disclosure. As shown in FIG. 5A, 4 pilot symbols in 4 clusters are dispersed among 60 data tones in an 8×8 subtile 502, where $N_P = 4$, and $M_Q = 1$. Referring to FIG. 5B, 8 pilot symbols in 4 clusters are dispersed among 56 data tones in an 8×8 subtile 504, where $N_P = 8$, and $M_Q = 2$. As shown in FIG. 5C, 12 pilot symbols in 4 clusters are dispersed among 52 data tones in an 8×8 subtile 506, where $N_P = 12$, and $M_Q = 3$.

To allow multiplexing, the pilot symbols of one user that belong to the same cluster are scrambled with a scrambling sequence; for simplicity, each user uses the same scrambling sequence for all clusters. The scrambling sequences of different users are orthogonal vectors of length $M_Q$ and are assumed to have unit modulus elements. There can be at most $M_Q$ such sequences, denoted by $S_k$, $k = 1, \ldots, M$.

The $N_P \times 1$ vector of pilot symbols transmitted by user q can be written as:

$$r_{1,q} := \frac{1}{\sqrt{N_P}} 1_{4\times 1} \otimes s_q \quad (10)$$

where $1_{N_C \times 1}$ is a column vector with $N_C$ ones and $\otimes$ denotes the Kronecker product. The vectors $r_{1,q}$, $q = 1, \ldots, Q$, are orthonormal. Define the following $N_P \times 1$ complex vectors $r_{i,q}$, $i = 1, \ldots, 4$, $q = 1, \ldots, Q_M$.

$$r_{i,q} := \frac{1}{\sqrt{N_P}} \alpha_i \otimes s_q \quad (11)$$

with $\alpha_1 := \begin{bmatrix} 1 \\ 1 \\ 1 \\ 1 \end{bmatrix}$, $\alpha_2 := \begin{bmatrix} -1 \\ -1 \\ 1 \\ 1 \end{bmatrix}$, $\alpha_3 := \begin{bmatrix} -1 \\ 1 \\ -1 \\ 1 \end{bmatrix}$, $\alpha_4 := \begin{bmatrix} 1 \\ -1 \\ -1 \\ 1 \end{bmatrix}$ The fact that, for each cluster, the scrambling sequences of users are orthogonal plays a role in the derivation of the algorithm.

2. Channel & interference estimation algorithm with embedded power offset estimation 2.1 Interference Estimation In one aspect, the information about the power of the interference is obtained using only the received pilot symbols. The observation space has $N_P$ dimensions, and the channel of each user is given by three parameters. Thus, the remaining $N_P - 3Q$ dimensions of the observation space may be used to obtain information about the power of the interference. Thus, in FIG. 5A, $N_P - 3Q$ (i.e., 4−3=1) dimension of the observation space may be used to obtain information about the power of the interference; in FIG. 5B, $N_P - 3Q$ (i.e., 8−6=2) dimensions of the observation space may be used to obtain information about the power of the interference; and in FIG. 5C, $N_P-3Q$ (i.e., 12−9=3) dimensions of the observation space may be used to obtain information about the power of the interference.

The interference is estimated as the power of the projection of the received signal on the dimensions unoccupied by the transmitted pilot signals. In other words, the received signal x is projected onto the basis $r_{i,q}$, i=1, . . . ,4, q=1, . . . ,$M_Q$ defined in Equation (11), and the power of the components corresponding to the interference is summed. If $w_{i,q}$ is defined as $$w_{i,q} := r_{i,q}^H x \tag{12}$$

the power of the interference may be estimated by averaging the power of the samples obtained:

$$\hat{\sigma}^2 = \frac{1}{4M_Q - 3Q}\left(\sum_{q=1}^{Q}|w_{4,q}|^2 + \sum_{i=1}^{4}\sum_{q=Q+1}^{M_Q}|w_{i,q}|^2\right) \tag{13}$$

The first sum may be an estimate of the noise power if the channel of each user has perfect linear variation in a tile. In practice however, it includes the channel modeling error. The second sum exists only if $Q<M_Q$, and is the power of the received signal despreaded with spreading sequences orthogonal on the sequences of the transmitting users.

2.2 User Power Offset Estimation

In one aspect, the method used for user power offset estimation is similar to the one used for interference estimation.

$$\hat{\Delta}_q^2 = \frac{1}{N_P}\sum_{i=1}^{3}|w_{i,q}|^2 \tag{14}$$

This method estimates the power offset of each user as the energy of the projections of the received pilots onto the dimensions occupied by the signal of the user of interest. This estimate may contain the energy of noise on the respective dimensions.

The interference influence is $3/N_P\sigma^2$, which, for $N_P$=12, is the actual noise level reduced by 6 dB. The effect of the interference term is negligible at high SNR, but it may become significant at low SNR.

A corrected version of the previous estimate is as follows:

$$\hat{\Delta}_q^2 = \max\left(\frac{1}{N_P}\sum_{i=1}^{3}|w_{i,q}|^2 - \frac{3}{N_P}\hat{\sigma}^2, 0\right) \tag{15}$$

The maximum is necessary to ensure that the power estimate is non-negative.

The channel estimation algorithm operates independently for each subtile. A more accurate user power offset estimate may be obtained by averaging the results obtained for different subtiles.

If multiple receive antennas are used, then a more accurate estimate may be obtained by averaging the power offset across receive antennas.

If less computational effort is required, then only the DC component can be used for power offset estimation:

$$\hat{\Delta}_q^2 = \frac{1}{N_P}|w_{1,q}|^2 \tag{16}$$

and $$\hat{\Delta}_q^2 = \max\left(\frac{1}{N_P}|w_{1,q}|^2 - \frac{1}{N_P}\hat{\sigma}^2, 0\right) \tag{17}$$

2.3 Channel Estimation

In one aspect, the channel estimates are given by an approximation to the MMSE estimator:

$$\hat{h}^{(q)} = E\{h^{(q)}x^H\}(E\{xx^H\})^{-1}x \tag{18}$$

The following may be obtained:

$$\Delta_q \hat{h}^{(q)} = \sum_{i=1}^{3}\frac{\Delta_q^2 \Lambda_i^{(q)}\beta_i}{\Delta_q^2 \Lambda_i^{(q)}\beta_i^2 + \hat{\sigma}^2}w_{i,q}U_i \tag{19}$$

The quantities $\beta_i$ are provided as follows:

$$\beta_1 := \left(\sqrt{\frac{N_S N_T}{N_P}}\right)^{-1} \tag{20}$$

$$\beta_2 := \left(\sqrt{\frac{N_S N_T(N_T^2-1)}{3N_P}}\frac{1}{N_T-\theta_T}\right)^{-1} \tag{21}$$

$$\beta_3 := \left(\sqrt{\frac{N_S N_T(N_S^2-1)}{3N_P}}\frac{1}{N_S-\theta_S}\right)^{-1} \tag{22}$$

The values $\theta_T$ and $\theta_S$ are obtained from the actual placement of the pilot symbols, and they identify the center of the clusters of pilot symbols within a tile. More exactly, the center of the upper-left cluster of pilot symbols may be given by $$\left(\frac{\theta_S+1}{2}, \frac{\theta_T+1}{2}\right).$$

If the pilot symbols are placed in the top "row", then $\theta_T$=1, if they are in the second "row", then $\theta_T$=3, and so on.

Figure 6:
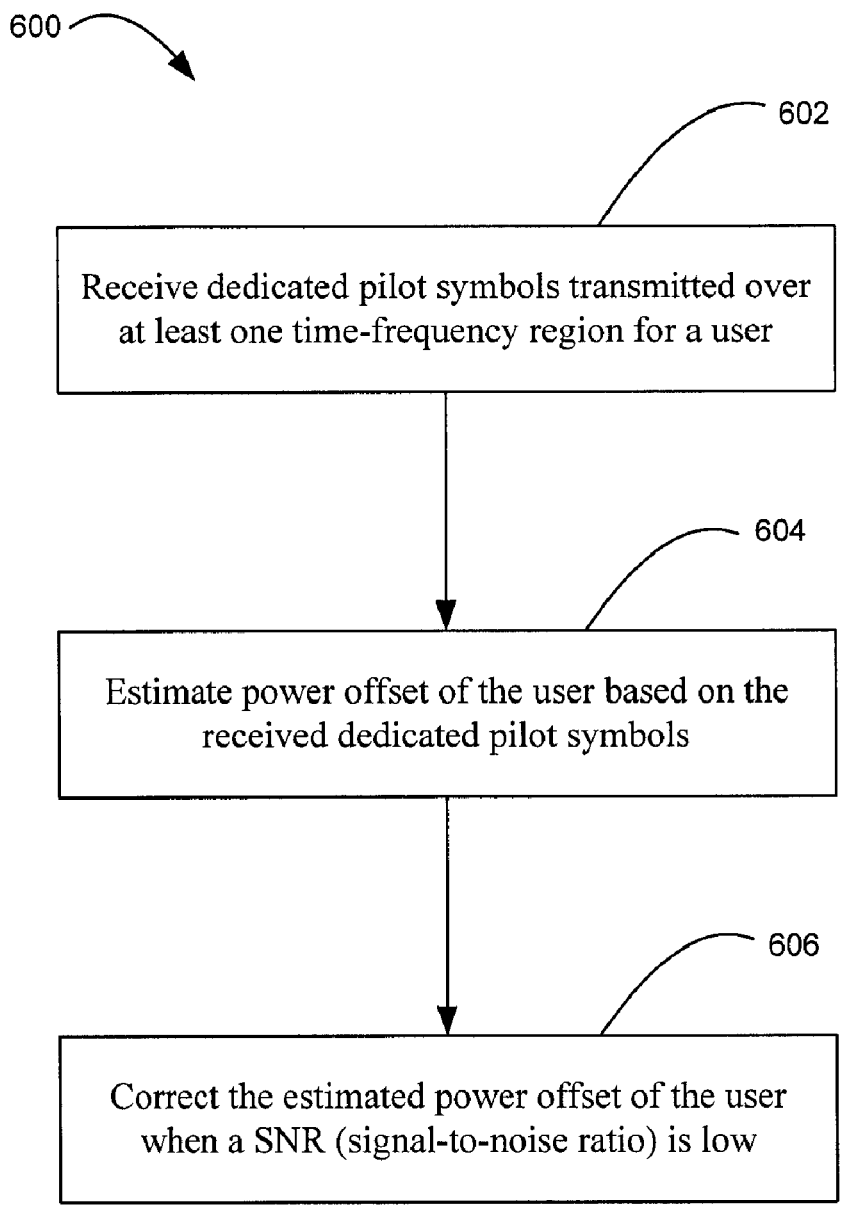
FIG. 6 is a flowchart of an exemplary method of user power offset estimation for a wireless communication system according to one aspect of the present disclosure.

FIG. 6 is a flowchart of an exemplary method 600 of user power offset estimation for a wireless communication system according to one aspect of the present disclosure. Dedicated pilot symbols transmitted over at least one time-frequency region for a user are received 602. A hop region is also referred to as a time-frequency region. Depending on the context, a time-frequency region may be a tile or a subtile. The at least one time-frequency region may be for a forward link or a reverse link of an orthogonal frequency division multiple access (OFDMA). A location of one of the at least one time-frequency region may be determined based on a frequency hopping algorithm. The dedicated pilot symbols may be grouped in clusters, where the clusters are symmetrically distributed about a center of one of the at least one time-frequency region. In one aspect, the number of users sharing the one of the at least one time-frequency region may be no greater than the number of dedicated pilot symbols included in one of the clusters.

Still referring to FIG. 6, power offset of the user may be estimated based on the received dedicated pilot symbols 604. In one aspect, the power offset of the user may be estimated as energy of projections of the received dedicated pilot symbols on dimensions occupied by a signal of the user. For example, the power offset of the user may be estimated using the foregoing-described Equation (14), or the like. In another aspect, the power offset of the user may be estimated as energy of projections of the received dedicated pilot symbols on one dimension occupied by a signal of the user, where the dimension captures most of energy of the signal. For example, the power offset of the user may be estimated using the foregoing-described Equation (16) or (17), or the like. In yet another aspect, the power offset of the user may be estimated based on at least one of the dedicated pilot symbols in one of the at least one time-frequency region. When a SNR (signal-to-noise ratio) is low, the estimated power offset of the user may be corrected 606. In one aspect, the estimated power offset of the user may be corrected based on an estimate of a power of interference. For example, the estimated power offset of the user may be corrected using the foregoing-described Equation (15) or (17), or the like.

In one aspect, when the wireless communication system includes multiple receive antennas, the power offset may be computed for each of the multiple receive antennas for the user. The computed power offsets may then be averaged across the multiple receive antennas for the user.

In another aspect, power offsets may be computed for more than one time-frequency region for the user. The computed power offsets may then be averaged across the more than one time-frequency region for the user.

In yet another aspect, the power offset may be computed for each of the multiple receive antennas for the user when the wireless communication system includes multiple receive antennas. Power offsets may be calculated for more than one time-frequency region for the user. The computed power offsets may be averaged across the multiple receive antennas, and the calculated power offsets may be averaged across the more than one time-frequency region for the user.

Figure 7:
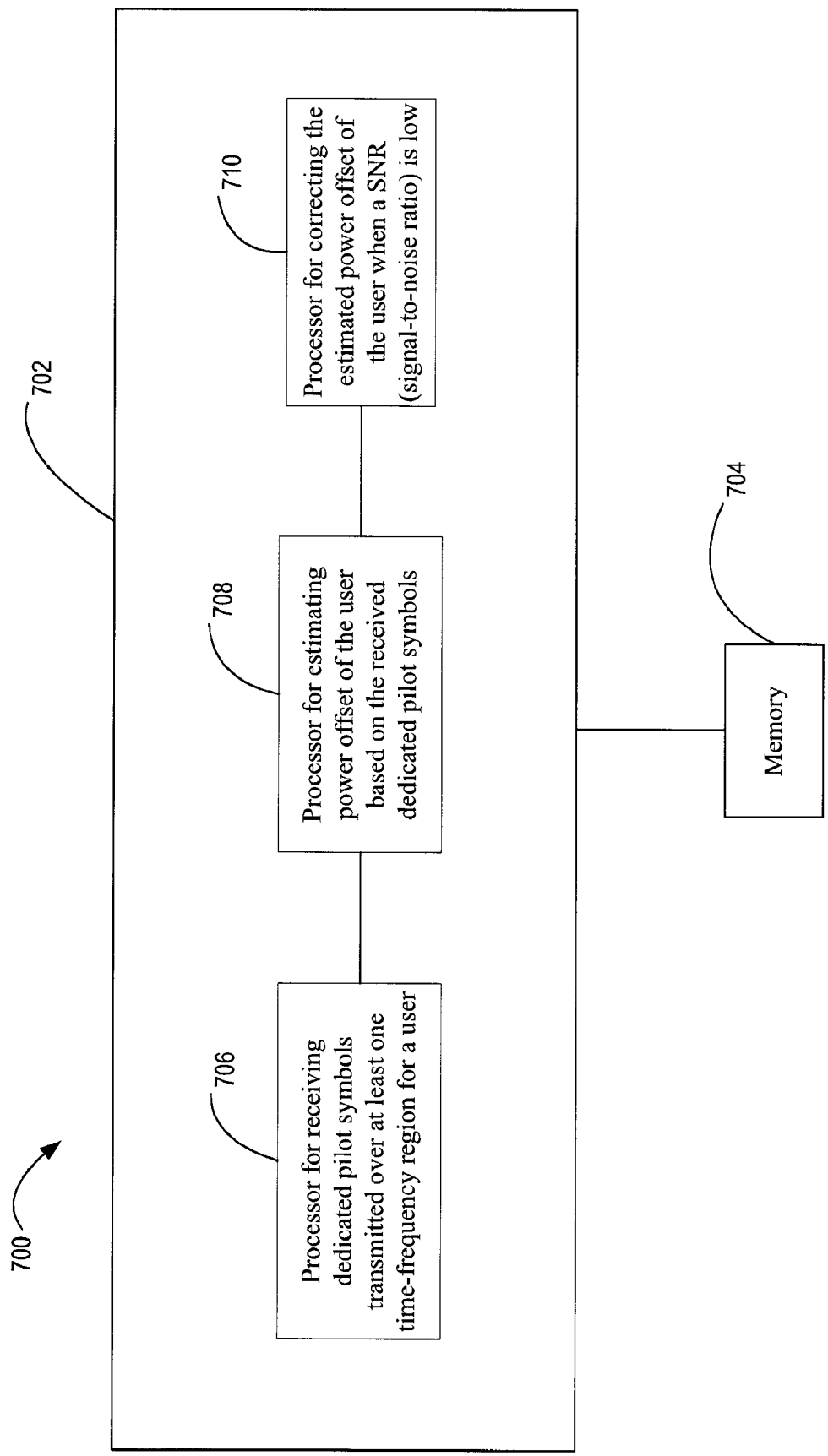
FIG. 7 is a block diagram of an apparatus of user power offset estimation for a wireless communication system according to one aspect of the present disclosure.

FIG. 7 is a block diagram of an apparatus 700 of user power offset estimation for a wireless communication system according to one aspect of the present disclosure. The apparatus 700 may include a processor 702 and a memory 704, which is coupled to the processor 702. The processor 702 may be configured to implement the method 600 illustrated in FIG. 6. Alternatively, the processor may include a processor 706 for receiving dedicated pilot symbols transmitted over at least one time-frequency region for a user, a processor 708 for estimating power offset of the user based on the received dedicated pilot symbols, and a processor 710 for correcting the estimated power offset of the user when the SNR (signal-to-noise ratio) is low.

The present method may be carried out using various codes of one or more software modules forming a program and executed as instructions/data by, e.g., a central processing unit, or using hardware modules specifically configured and dedicated to perform the present method. Alternatively, in some embodiments, the present method may be carried out using a combination of software and hardware modules.

The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of user power offset estimation for a wireless communication system, comprising:
   receiving dedicated pilot symbols transmitted over at least one time-frequency region for a user, wherein the received dedicated pilot symbols are inserted among data symbols; and
   estimating power offset of the user based on the received dedicated pilot symbols,
      wherein the power offset of the user is estimated based on energy of projections of the received dedicated pilot symbols on one or more dimensions occupied by a signal of the user.

2. The method of claim 1, wherein the power offset of the user is estimated as an energy of the projections of the received dedicated pilot symbols on a dimension of the one or more dimensions capturing most of the energy of the signal.

3. The method of claim 1, wherein the power offset of the user is estimated based on at least one of the received dedicated pilot symbols in one of the at least one time-frequency region.

4. The method of claim 1, further comprising correcting the estimated power offset of the user when a SNR (signal-to-noise ratio) is low.

5. The method of claim 4, wherein the estimated power offset of the user is corrected based on an estimate of a power of interference.

6. The method of claim 1, further comprising:
   computing, when the wireless communication system includes multiple receive antennas,
      power offset for each of the multiple receive antennas for the user; and
   averaging the computed power offsets across the multiple receive antennas for the user.

7. The method of claim 1, further comprising:
   computing power offsets for more than one time-frequency region for the user; and
   averaging the computed power offsets across the more than one time-frequency region for the user.

8. The method of claim 1, further comprising:
   computing, when the wireless communication system includes multiple receive antennas,
      power offset for each of the multiple receive antennas for the user;
   calculating power offsets for more than one time-frequency region for the user; and
   averaging the computed power offsets across the multiple receive antennas and the calculated power offsets across the more than one time-frequency region for the user.

9. The method of claim 1, wherein the received dedicated pilot symbols are grouped in clusters, the clusters being symmetrically distributed about a center of one of the at least one time-frequency region.

10. The method of claim 9, wherein a number of users sharing the one of the at least one time-frequency region is not greater than a number of dedicated pilot symbols included in one of the clusters.

11. The method of claim 1, wherein the at least one time-frequency region is for a forward link or a reverse link of an orthogonal frequency division multiple access (OFDMA) system.

12. The method of claim 1, wherein a location of one of the at least one time-frequency region is determined based on a frequency hopping algorithm.

13. An apparatus operable in a wireless communication system, comprising:
   a processor configured to
      receive dedicated pilot symbols transmitted over at least one time-frequency region for a user, wherein the received dedicated pilot symbols are inserted among data symbols, and
      estimate power offset of the user based on the received dedicated pilot symbols,
         wherein the power offset of the user is estimated based on energy of projections of the received dedicated pilot symbols on one or more dimensions occupied by a signal of the user; and
   a memory coupled to the processor.

14. The apparatus of claim 13, wherein the power offset of the user is estimated as an energy of the projections of the received dedicated pilot symbols on a dimension of the one or more dimensions capturing most of energy of the signal.

15. The apparatus of claim 13, wherein the power offset of the user is estimated based on at least one of the received dedicated pilot symbols Currently Amended in one of the at least one time-frequency region.

16. The apparatus of claim 13, wherein the processor is further configured to correct the estimated power offset of the user when a SNR (signal-to-noise ratio) is low.

17. The apparatus of claim 16, wherein the estimated power offset of the user is corrected based on an estimate of a power of interference.

18. The apparatus of claim 13, wherein the processor is further configured to
   compute, when the wireless communication system includes multiple receive antennas,
      power offset for each of the multiple receive antennas for the user, and
   average the computed power offsets across the multiple receive antennas for the user.

19. The apparatus of claim 13, wherein the processor is further configured to
   compute power offsets for more than one time-frequency region for the user, and
   average the computed power offsets across the more than one time-frequency region for the user.

20. The apparatus of claim 13, wherein the processor is further configured to
compute, when the wireless communication system includes multiple receive antennas,
power offset for each of the multiple receive antennas for the user,
calculate power offsets for more than one time-frequency region for the user, and
average the computed power offsets across the multiple receive antennas and the calculated power offsets across the more than one time-frequency region for the user.

21. The apparatus of claim 13, wherein the received dedicated pilot symbols are grouped in clusters, the clusters being symmetrically distributed about a center of one of the at least one time-frequency region.

22. The apparatus of claim 21, wherein a number of users sharing the one of the at least one time-frequency region is not greater than a number of dedicated pilot symbols included in one of the clusters.

23. The apparatus of claim 13, wherein the at least one time-frequency region is for a forward link or a reverse link of an orthogonal frequency division multiple access (OFDMA) system.

24. The apparatus of claim 13, wherein a location of one of the at least one time-frequency region is determined based on a frequency hopping algorithm.

25. An apparatus operable in a wireless communication system, comprising:
means for receiving dedicated pilot symbols transmitted over at least one time-frequency region for a user, wherein the received dedicated pilot symbols are inserted among data symbols; and
means for estimating power offset of the user based on the received dedicated pilot symbols, wherein the power offset of the user is estimated based on energy of projections of the received dedicated pilot symbols on one or more dimensions occupied by a signal of the user.

26. The apparatus of claim 25, wherein the power offset of the user is estimated as an energy of the projections of the received dedicated pilot symbols on a dimension of the one or more dimensions capturing most of energy of the signal.

27. The apparatus of claim 25, wherein the power offset of the user is estimated based on at least one of the received dedicated pilot symbols in one of the at least one time-frequency region.

28. The apparatus of claim 25, further comprising means for correcting the estimated power offset of the user when a SNR (signal-to-noise ratio) is low.

29. The apparatus of claim 28, wherein the estimated power offset of the user is corrected based on an estimate of a power of interference.

30. The apparatus of claim 25, further comprising:
means for computing, when the wireless communication system includes multiple receive antennas, power offset for each of the multiple receive antennas for the user; and
means for averaging the computed power offsets across the multiple receive antennas for the user.

31. The apparatus of claim 25, further comprising:
means for computing power offsets for more than one time-frequency region for the user; and
means for averaging the computed power offsets across the more than one time-frequency region for the user.

32. The apparatus of claim 25, further comprising:
means for computing, when the wireless communication system includes multiple receive antennas, power offset for each of the multiple receive antennas for the user;
means for calculating power offsets for more than one time-frequency region for the user; and
means for averaging the computed power offsets across the multiple receive antennas and the calculated power offsets across the more than one time-frequency region for the user.

33. The apparatus of claim 25, wherein the received dedicated pilot symbols are grouped in clusters, the clusters being symmetrically distributed about a center of one of the at least one time-frequency region.

34. The apparatus of claim 33, wherein a number of users sharing the one of the at least one time-frequency region is not greater than a number of dedicated pilot symbols included in one of the clusters.

35. The apparatus of claim 25, wherein the at least one time-frequency region is for a forward link: or a reverse link: of an orthogonal frequency division multiple access (OFDMA) system.

36. The apparatus of claim 25, wherein a location of one of the at least one time-frequency region is determined based on a frequency hopping algorithm.

37. A computer program product, comprising:
a computer-readable medium comprising:
code for causing a computer to receive dedicated pilot symbols transmitted over at least one time-frequency region for a user, wherein the received dedicated pilot symbols are inserted among data symbols; and
code for causing the computer to estimate power offset of the user based on the received dedicated pilot symbols, wherein the power offset of the user is estimated based on energy of projections of the received dedicated pilot symbols on one or more dimensions occupied by a signal of the user.

38. The computer program product of claim 37, wherein the power offset of the user is estimated as an energy of the projections of the received dedicated pilot symbols a dimension of the one or more dimensions capturing most of energy of the signal.

39. The computer program product of claim 37, wherein the power offset of the user is estimated based on at least one of the received dedicated pilot symbols in one of the at least one time-frequency region.

40. The computer program product of claim 37, wherein the computer-readable medium further comprising:
code for causing the computer to correct the estimated power offset of the user when a SNR (signal-to-noise ratio) is low.

41. The computer program product of claim 40, wherein the estimated power offset of the user is corrected based on an estimate of a power of interference.

42. The computer program product of claim 37, wherein the computer-readable medium further comprising:
code for causing the computer to compute, when the wireless communication system includes multiple receive antennas, power offset for each of the multiple receive antennas for the user; and
code for causing the computer to average the computed power offsets across the multiple receive antennas for the user.

43. The computer program product of claim 37, wherein the computer-readable medium further comprising:
code for causing the computer to compute power offsets for more than one time-frequency region for the user; and
code for causing the computer to average the computed power offsets across the more than one time-frequency region for the user.

44. The computer program product of claim 37, wherein the computer-readable medium further comprising:
  code for causing the computer to compute, when the wireless communication system includes multiple receive antennas, power offset for each of the multiple receive antennas for the user;
  code for causing the computer to calculate power offsets for more than one time-frequency region for the user; and
  code for causing the computer to average the computed power offsets across the multiple receive antennas and the calculated power offsets across the more than one time-frequency region for the user.

45. The computer program product of claim 37, wherein the received dedicated pilot symbols are grouped in clusters, the clusters being symmetrically distributed about a center of one of the at least one time-frequency region.

46. The computer program product of claim 45, wherein a number of users sharing the one of the at least one time-frequency region is not greater than a number of dedicated pilot symbols included in one of the clusters.

47. The computer program product of claim 37, wherein the at least one time-frequency region is for a forward link or a reverse link of an orthogonal frequency division multiple access (OFDMA) system.

48. The computer program product of claim 37, wherein a location of one of the at least one time-frequency region is determined based on a frequency hopping algorithm.

* * * * *